United States Patent
Kamali

(10) Patent No.: US 9,397,872 B2
(45) Date of Patent: Jul. 19, 2016

(54) SYSTEM AND METHOD OF LINK OPTIMIZATION

(71) Applicant: Samsung Display Co., Ltd., Yongin, Gyeonggi-Do (KR)

(72) Inventor: Jalil Kamali, San Jose, CA (US)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 14/741,135

(22) Filed: Jun. 16, 2015

(65) Prior Publication Data

US 2016/0006589 A1 Jan. 7, 2016

Related U.S. Application Data

(60) Provisional application No. 62/019,832, filed on Jul. 1, 2014.

(51) Int. Cl.
*H04L 27/01* (2006.01)
*H04B 3/46* (2015.01)

(52) U.S. Cl.
CPC . *H04L 27/01* (2013.01); *H04B 3/46* (2013.01)

(58) Field of Classification Search
CPC .......... H04L 2025/03356; H04L 25/0224; H04L 25/03038; H04L 27/01; G06F 17/5009; G06F 17/5036; G06F 2217/10; H04B 3/46
USPC .................................................. 375/229–232
See application file for complete search history.

(56) References Cited

U.S. PATENT DOCUMENTS

| 5,157,690 A * | 10/1992 | Buttle | H03H 21/0012 333/18 |
| 6,049,574 A * | 4/2000 | Noonan | H04L 25/0305 375/231 |
| 7,505,512 B1 * | 3/2009 | Anderson | H04L 25/03038 375/224 |
| 2002/0080896 A1 * | 6/2002 | Riess | H04L 25/0238 375/341 |
| 2009/0187807 A1 * | 7/2009 | Narasimha | H03M 13/01 714/761 |
| 2012/0016650 A1 * | 1/2012 | Hollis | G06F 17/5036 703/13 |
| 2013/0317796 A1 * | 11/2013 | Hollis | G06F 17/5036 703/2 |
| 2014/0286387 A1 * | 9/2014 | Cronie | H04B 1/10 375/232 |

* cited by examiner

*Primary Examiner* — Freshteh N Aghdam
(74) *Attorney, Agent, or Firm* — Innovation Counsel LLP

(57) ABSTRACT

A method of characterizing a channel between a transmitter and a receiver (e.g., in a high-speed link) is presented. The method comprises: determining an overall intersymbol interference (ISI) probability density function (PDF) from eye monitor data obtained for a current equalizer setting, extracting a channel ISI PDF for the current equalizer setting from the overall ISI PDF, and generating an overall ISI PDF for a different equalizer setting by using the channel ISI PDF for the current equalizer setting and an impulse response at the different equalizer setting. Based on this characterization, an optimal equalizer setting may be selected among a plurality of equalizer settings on the basis of the channel ISI PDF and the equalizer response functions.

20 Claims, 11 Drawing Sheets

SYSTEM AND METHOD OF LINK OPTIMIZATION

CROSS-REFERENCE TO RELATED APPLICATIONS

This application claims priority to and the benefit of U.S. Provisional Patent Application No. 62/019,832 titled "A METHOD FOR EYE MONITOR BASED ISI ESTIMATION AND LINK OPTIMIZATION IN HIGH SPEED LINKS" and filed on Jul. 1, 2014, the entire content of which is incorporated herein by reference.

RELATED FIELD

The present disclosure relates in general to link optimization, and in particular, to a system and method of link optimization using channel information from an eye monitor.

BACKGROUND

Electronic devices are operating at increasingly faster speeds. As a result, high speed links are often used to carry information between the electronic devices or between electronic components within an electronic device. A common type of high speed link is a Serializer/Deserializer (SerDes) link, which converts a parallel data stream from multiple data lines into a serial data stream for transmission over a single data line, and vice versa. For example, in a SerDes link, a transmitter at one end of the link may receive eight bits of data in parallel at a slower, parallel clock rate and shift out each of the eight bits serially at a faster, serial clock rate (e.g., 8× the parallel clock rate). A receiver at another end of the link may receive each of the eight bits serially at the faster, serial clock rate and output the eight bits of data in parallel at the slower, parallel clock rate. By transmitting data over a single/differential line, a SerDes link allows the number of I/O pins and interconnects of the electronic device or its components to be reduced.

Establishing a high speed link generally requires an initialization period during which both the transmitter side and the receiver side of the link are synchronized and properly trained. Training may include, for example, performing calibrations, clock data recovery (CDR), and equalization training. However, a majority of SerDes standards use a blind initialization technique in which the link is expected to become operational within a given time after powering up without any predefined signal exchange. In the case of equalization training, this means that an equalizer in the receiver is trained blindly without information about the link's channel. A "channel" refers to the transmission medium through which data is transmitted, and may be wired, wireless, or a combination of the two.

When the equalizer is trained blindly without knowledge of the channel information, the equalizer is usually not optimized and unable to minimize the intersymbol interference (ISI) effects of the channel. In view of the foregoing, there exists a need for a system and method of link optimization that overcome these problems.

SUMMARY

In one aspect, the present disclosure provides a method of characterizing a channel between a transmitter and a receiver, comprising: determining an overall intersymbol interference (ISI) probability density function (PDF) from eye monitor data obtained for a current equalizer setting; extracting a channel ISI PDF from the overall ISI PDF by using the current equalizer setting; and generating an overall ISI PDF for a different equalizer setting by using the channel ISI PDF obtained using the current equalizer setting and an impulse response at the different equalizer setting.

In another aspect, the present disclosure provides a method of optimizing a high-speed link including an equalizer, the method comprising: determining a first overall ISI PDF from eye monitor data obtained for a current equalizer setting; extracting a channel ISI PDF from the first overall ISI PDF by using the current equalizer setting; generating a second overall ISI PDF for a different equalizer setting by using the channel ISI PDF for the current equalizer setting; and determining an optimum equalizer setting based on a comparison of the first overall ISI PDF and the second overall ISI PDF.

In another aspect, the present disclosure provides a system of optimizing a high-speed link including a channel carrying a data signal between a transmitter and a receiver. The system comprises an equalizer having a plurality of equalizer settings and configured to equalize a signal received from a channel according to a current equalizer setting to generate an equalized signal; an eye monitor configured to output first bit error rate (BER) values on the basis of the equalized signal at different phase and voltage levels; and a link optimization unit. The link optimization unit includes: a module configured to determine a first overall intersymbol interference (ISI) probability density function (PDF) from the BER values obtained for a current equalizer setting; a module configured to extract a channel ISI PDF for the current equalizer setting from the first overall ISI PDF; and a module configured to generate a second overall ISI PDF for a different equalizer setting by using the channel ISI PDF for the current equalizer setting.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
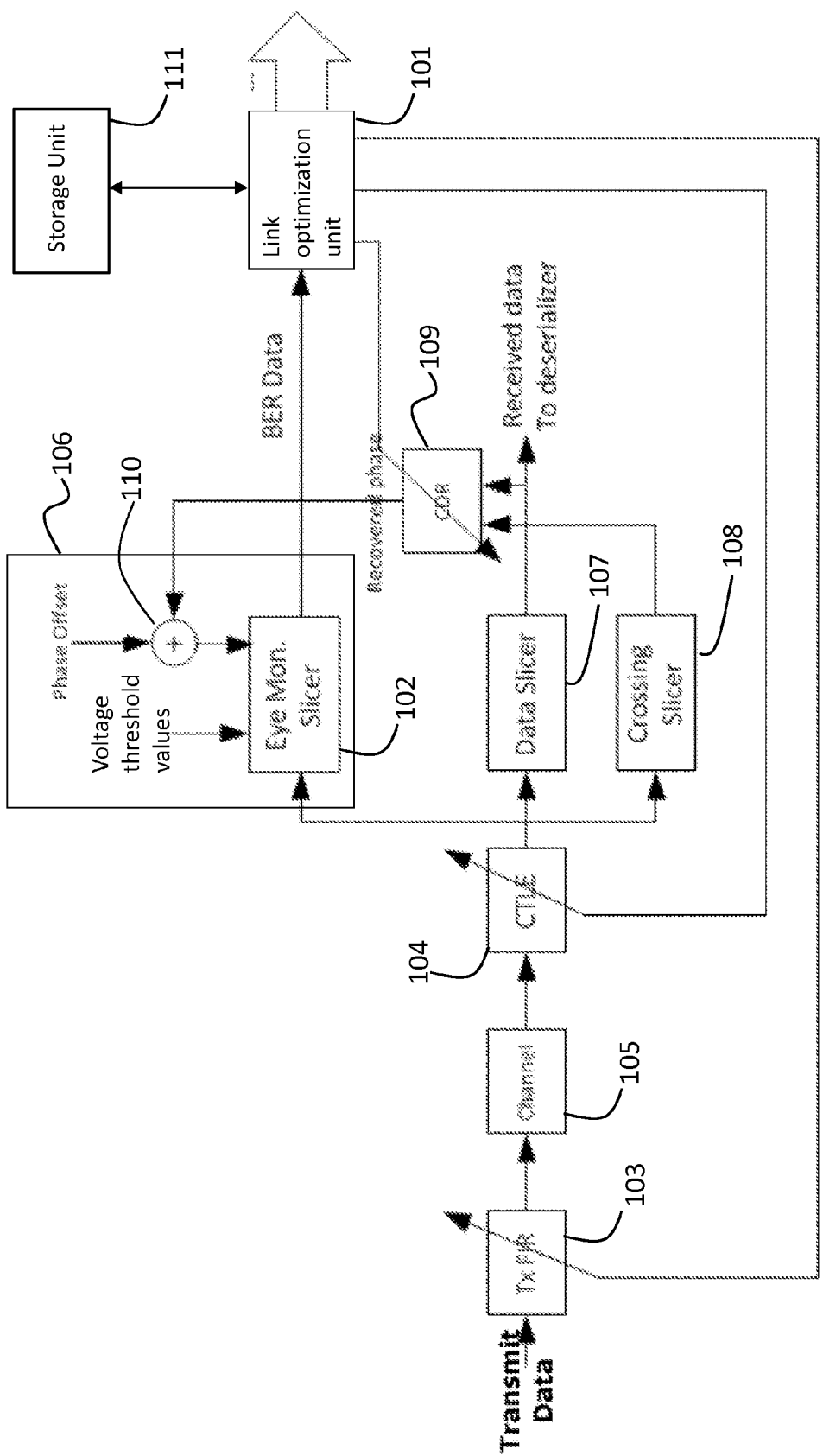
FIG. 1 illustrates an implementation of a link optimization unit, according to an exemplary embodiment of the present system and method.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide a system and method of link optimization. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

As mentioned above, traditional, blind equalization training often fails to optimize one or more components of a link. For example, equalization in a SerDes link may be performed through a combination of the following components: a digital, finite impulse response (FIR) filter in the transmitter (e.g., having two, three, or four taps), and a decision feedback equalizer (DFE) and a continuous time linear equalizer (CTLE) in the receiver. If the FIR filter in the transmitter has two taps (e.g., pre and post) in addition to the main tap, the FIR filter is typically not trained, or simple back channel training may be used. As for the DFE, its taps may be found through a least-mean-square (LMS) algorithm after the CDR converges.

It is desirable to optimally equalize the channel by finding the right transmitter and receiver settings. The CTLE, however, may have many settings (e.g., 64 and 128), and finding the optimal setting is not straightforward due to the absence of channel information at the receiver. Unlike for the DFE taps, an LMS type algorithm may not be effective because the CTLE's transfer function usually does not depend on a few tap values linearly related to the error.

Availability of channel information would be useful in training the CTLE as it would help determine the optimal setting that results in low or minimum ISI. ISI generally describes a distortion of the received signal, e.g., due to the combined impulse responses of the FIR filter, channel, DFE, and CTLE. In addition to CTLE optimization, the estimated channel information would enable the receiver to determine the general performance of the link, such as whether the CDR converged to the optimum phase, or the DFE taps converged to the optimal settings.

The present disclosure describes a system and method of characterizing a link channel by using an eye monitor, and using that channel information to determine the optimum link settings. Particularly, according to an exemplary embodiment, a link optimization unit determines the optimal setting of a link component, such as an equalizer in a receiver and/or a FIR filter in a transmitter, during initialization of the link. A process for determining the optimal setting may include estimating an overall intersymbol interference (ISI) probability density function (PDF) from one or more bit error rate (BER) values provided by an eye monitor and extracting a channel ISI PDF from the overall ISI PDF. The BER value for a communication channel provides an indication of the quality of the communication channel. Using the channel ISI PDF and the known impulse response of the link component at various settings, the link optimization unit calculates a BER value for each setting. Thereafter, the link optimization unit selects the optimal setting for the link component. In one embodiment, the setting that results in the lowest BER value may be selected. In another embodiment, the setting corresponding to the overall ISI PDF having the shortest width may be selected as the optimal setting for the link component.

FIG. 1 illustrates an implementation of a link optimization unit, according to an exemplary embodiment of the present system and method. As FIG. 1 shows, the link optimization unit 101 receives BER values from an eye monitor 106 and provides optimal settings to a Tx FIR filter 103 in a transmitter and a CTLE 104 in a receiver, each of which may have a plurality of settings. Data is transmitted from the transmitter to the receiver over a channel 105 of a link (e.g., SerDes link).

The link optimization unit 101 is also in communication with and may access a storage unit 111. The storage unit 111 stores response functions corresponding to the impulse response of one or more link components for each of their settings. For example, one or more response functions may be stored for each of the settings of the Tx FIR filter 103 and CTLE 104. As the impulse response of a link component usually does not change substantially, these response functions may be predetermined and stored in advance. The response functions may include impulse response functions, PDFs of the impulse response functions (hereinafter, "impulse PDFs"), Fourier transforms of the impulse PDFs, and the like.

During the link initialization period, the transmitter transmits data over the channel 105 for training the Tx FIR filter 103 and the CTLE 104. The data transmitted may be a pseudo-random sequence of data bit values. To counteract the lossy effects of the channel 105, the Tx FIR filter 103 may pre-emphasize the data signal before its transmission according to its current setting, which may be a default setting. Pre-emphasizing the data signal increases the magnitude of the signal in a particular frequency band to improve its overall signal-to-noise ratio. After the data signal is transmitted over the channel 105, the symbols, or the representation of the data bits, of the data signal may be blurred together. This blurring together of symbols is generally referred to as ISI and is a form of signal distortion in which symbols transmitted at different points in time interfere with one another when they are received. The CTLE 104 receives the distorted data signal from the channel 105 and performs equalization according to its current setting, which may be a default setting, to generate an equalized signal in which the ISI effects are reduced or removed.

The CTLE 104 outputs the equalized signal to each of an eye monitor 106, a data slicer 107, and a crossing slicer 108. The eye monitor 106 analyzes the equalized signal to monitor the performance of the link, which is described in further detail below. The data slicer 107 detects the symbols in the equalized signal and outputs the data bits corresponding to the symbols (e.g., "0" or "1") to a CDR unit 109 and a data deserializer (not shown). The crossing slicer 108 detects a crossing state of the equalized signal (i.e., whether the signal voltage at sampling point lies above or below zero) and outputs the detection results to the CDR unit 109. The CDR unit 109 uses the outputs from the data slicer 107 and crossing slicer 108 to recover a clock signal. That is, the CDR unit 109 generates a clock signal that approximates the clock rate at which the data was transmitted and phase-aligns the generated clock to the transitions of the equalized data signal using, for example, a phase-locked loop. The generated clock is output to a phase shifter 110 in the eye monitor 106.

The eye monitor 106 is a useful tool for evaluating the performance of the overall link at the current settings of the Tx FIR filter 103 and CTLE 104. In particular, the eye monitor 106 may be used to estimate information about the channel, which may then be used by the link optimization unit 101 to estimate the overall performance of the link at various other settings of the Tx FIR filter 103 and the CTLE 104. By comparing the performances at different settings, the optimal settings can be determined without time consuming trial and error or sub-optimal channel agnostic pre-selection. That is, the link optimization unit 101 may estimate the link performance at various other phases, CTLE settings, Tx FIR filter settings, and DFE coefficients (though DFE not included in FIG. 1) from the BER values output by the eye monitor 106 (herein also referred to as "eye monitor data") for a given recovered phase and CTLE setting.

The eye monitor 106 monitors the performance of the overall link by using an eye monitor slicer 102 to analyze the equalized signal output from the CTLE 104. For example, using a sampler, or two samplers in unrolled DFE systems, the eye monitor slicer 102 may sample the equalized signal and compare the sample with a voltage threshold value. The sampling and comparison may be performed over a range of phases by sweeping a sampling clock (e.g., 128 phases for a 7-bit phase interpolator), as well as over a range of voltage threshold levels (e.g., 7-bit values or 128 different levels). The eye monitor slicer 102 may receive the sampling clock from the phase shifter 110, which phase shifts the clock signal received from the CDR unit 109 according to a phase offset signal. By varying the phase offset signal, the sampling clock can be swept over a range of phases. The eye monitor 106 may internally generate the phase offset signal and the voltage threshold values provided to the eye monitor slicer 102, or may receive them from a source external to the eye monitor 106.

The eye monitor slicer 102 outputs BER values to the link optimization unit 101. To generate a BER value for a particular phase and a particular voltage threshold value, the eye monitor slicer 102 samples the equalized signal using the sampling clock having the particular phase and compares the sampled value with the particular voltage threshold value. If the sampled data is positive but smaller than the threshold or negative but larger than the threshold, an error event is detected and a counter value C is incremented. When the comparison is performed across N symbols, the counter value C divided by N approximates the BER value. Increasing N increases the accuracy of the BER value.

Figure 2:
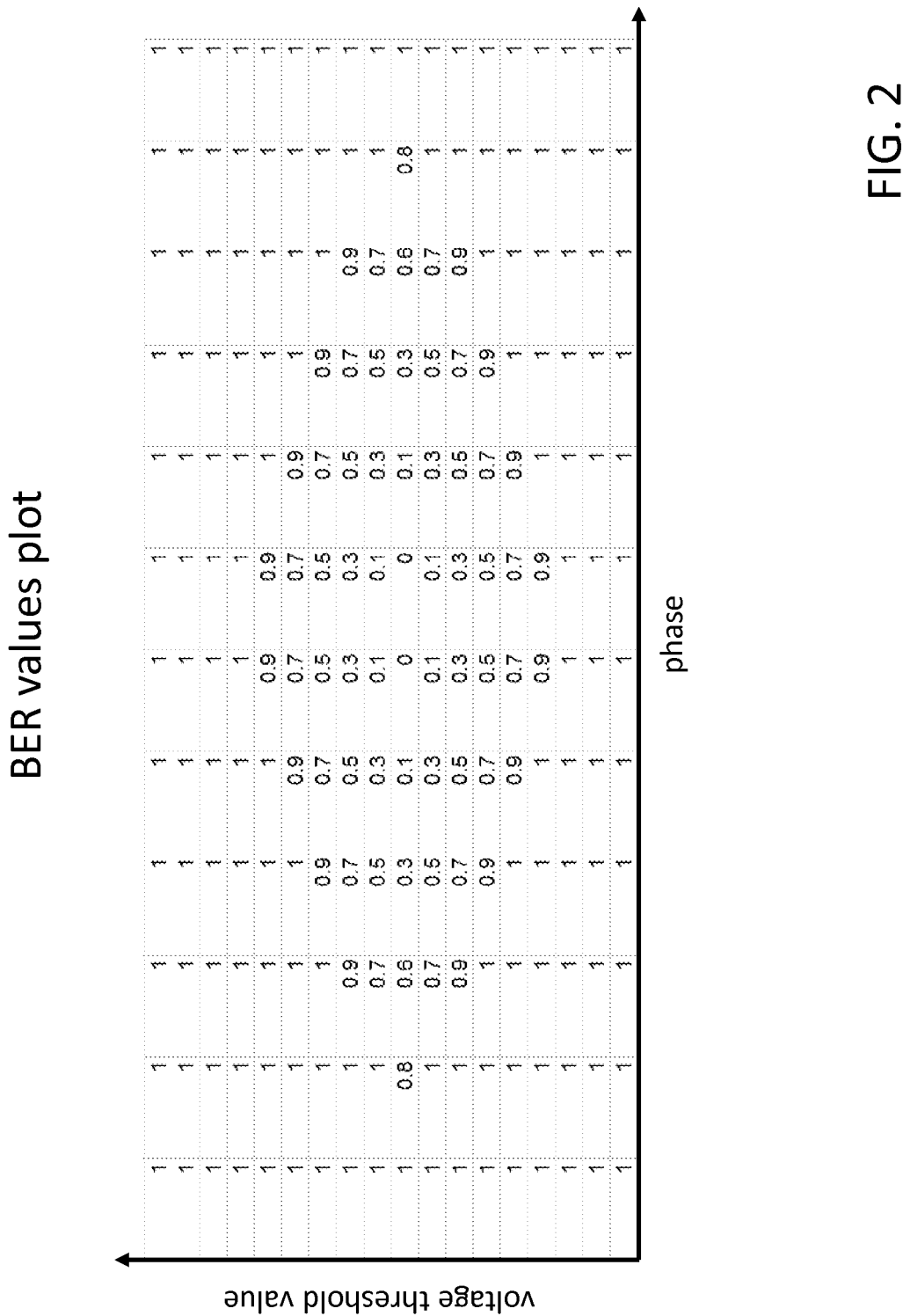
FIG. 2 illustrates an example of an eye diagram formed by plotting Bit Error Rate (BER) values calculated over a range of phases and a range of voltage threshold values.

When BER values are calculated over a range of phases and a range of voltage threshold values, a plot of the BER values results in an eye diagram whose overall shape resembles an eye. FIG. 2 shows an example of such an eye diagram. The resolution of the eye diagram may be increased by increasing the number of phase values and vertical threshold values within their respective ranges. The current settings of the Tx FIR filter 103 and CTLE 104 at which the BER values are calculated may be chosen such that the eye diagram is sufficiently open. Horizontal and vertical eye openings (timing and voltage margins) may be estimated from the eye monitor. The eye diagram may be considered sufficiently open, for example, if there are BER values of "0" near the center region of the eye diagram, such as shown in FIG. 2.

Figure 3:
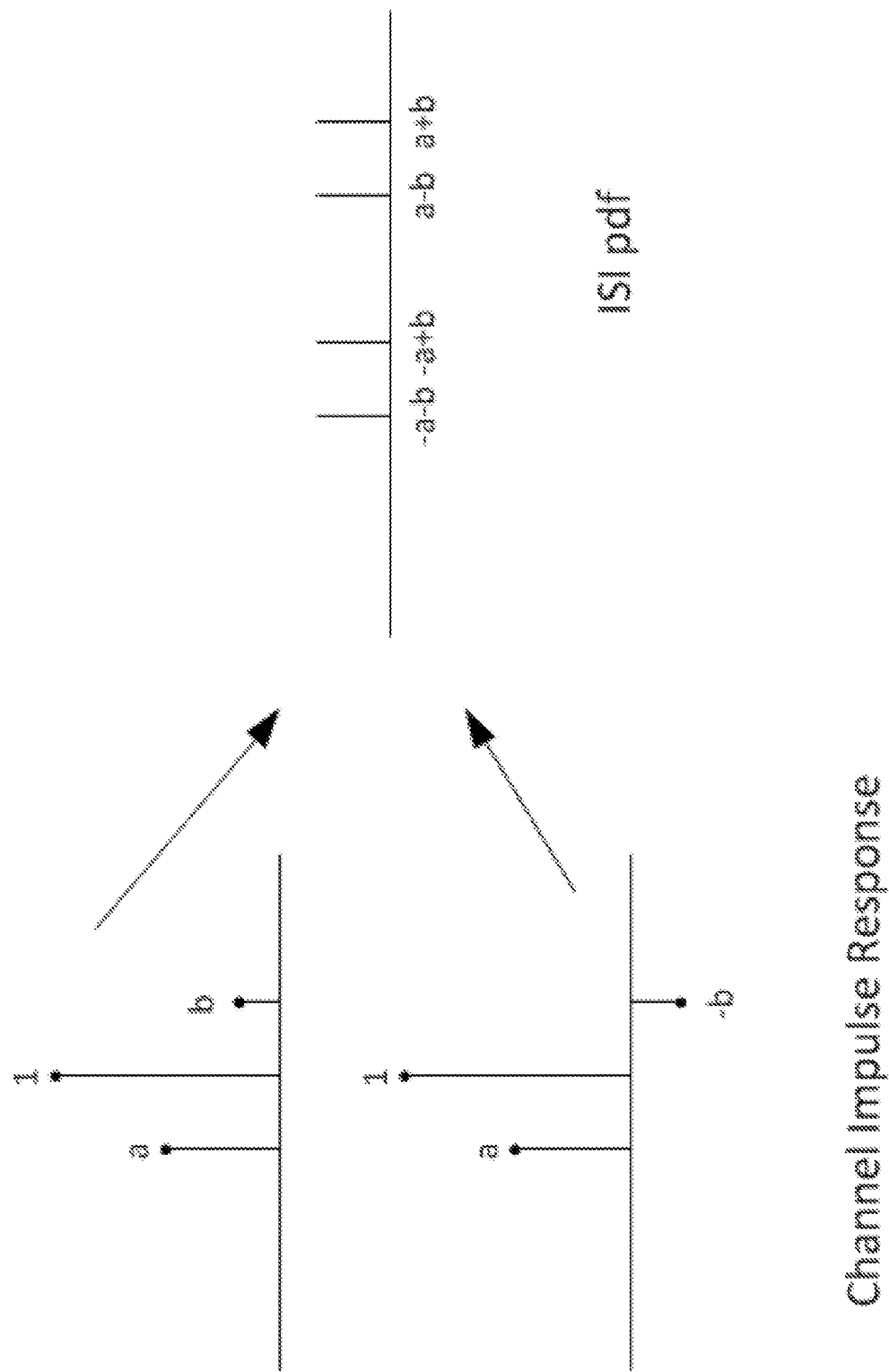
FIG. 3 illustrates an example in which two different channel impulse response functions may result in the same channel intersymbol interference (ISI) probability density function (PDF).

Referring back to FIG. 1, the link optimization unit 101 receives BER values from the eye monitor 106 and estimates channel information from the BER values. However, such estimation of channel impulse response based on BER values is challenging because different impulse functions (of the CTLE) may produce the same BER value and the same eye diagram, or the same ISI PDF as shown in FIG. 3. This ambiguity may be overcome by utilizing the fact that the overall ISI PDF of the link, which is an indicator of the overall link performance, may be estimated from the BER values. Hence, one aspect of the inventive concept disclosed herein entails obtaining the BER values (and eye diagram), estimating the overall ISI PDF of the link at current Tx and Rx settings, and extracting the channel ISI PDF from the overall ISI PDF and using it to estimate the overall ISI PDFs of the link for different settings of the CTLE 104 and Tx FIR filter 103 to select the optimum setting. This process, which is described in further detail below, may be executed by the link optimization unit 101.

Equation 1 below illustrates the relationship between a BER value and an ISI PDF:

$$BER = \sum_i BER_i p_i = \sum_i P[n > d_i] p_i = \sum_i p_i Q\left(\frac{d_i}{\sigma_n}\right), \quad \text{(Equation 1)}$$

wherein $BER_i = P[n > d_i] = Q(d_i/\sigma_n)$ represents the probability of error due to noise, $\sigma_n$ represents the noise rms power, and $p_i$ represents the ISI PDF. That is, the BER value depends on the ISI PDF defined by the $p_i$ values and on the channel noise defined by the Q-function.

Equation 1 may be evaluated to arrive at a BER value given the $p_i$ values and the noise rms power, or it may be evaluated in reverse to arrive at the $p_i$ values given a plurality of BER values and the noise rms power. Hence, Equation 1 may be used to find one overall ISI PDF for each phase. For example, the eye monitor 106 may calculate and provide an m number of BER values to the link optimization unit 101, wherein m≥N (N is the number of voltage levels in the eye monitor, for instance 128 levels). The m BER values may be calculated at the same phase Ø but different voltage threshold values. Then, using Equation 1, a system of m (over-determined if m>N) linear equations may be set up and solved for to arrive at the $p_i$ values that define the overall ISI PDF at phase Ø. Since there is a high correlation between the overall ISI PDFs of neighboring phases, smoothing of the overall ISI PDFs may be performed using such correlation. If the noise rms power is known a priori, it may be used. Otherwise, the noise rms power may be estimated recursively using known methods.

Figure 4:
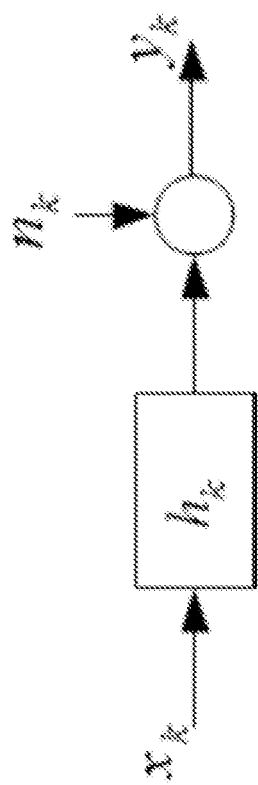
FIG. 4 illustrates an example of an additive white Gaussian noise (AWGN) model commonly used for channel and noise modeling in high speed links.
Figure 5:
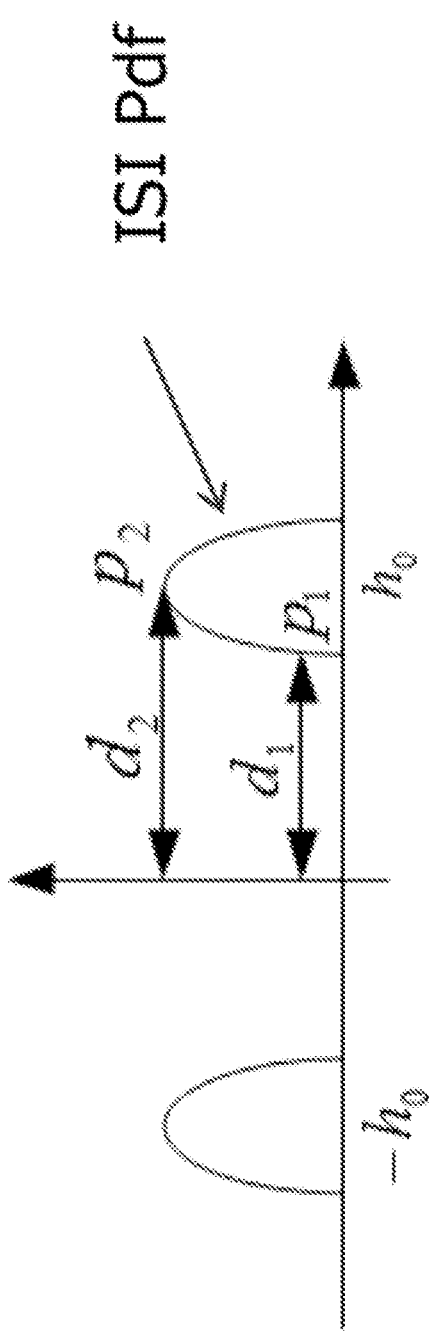
FIG. 5 illustrates an example of an ISI PDF function of a channel having an overall channel response $h_k$.

FIG. 4 shows an example of an additive white Gaussian noise (AWGN) model commonly used for channel and noise modeling in high speed links. The channel having an overall channel response $h_k$ takes $x_k$ as input. The overall output $y_k$ of the model is the combination of the channel output and the added noise $n_k$. FIG. 5 shows an example of an ISI PDF function generated by the channel of FIG. 4 having the overall channel response $h_k$, wherein $-h_0$ and $h_0$ are the received signals if there is no ISI and represent channel loss. p1 is the probability that the output signal amplitude is d1, and p2 is the probability that the output signal amplitude is d2. Equation 1 may be modified to account for slicer sensitivity, jitter, duty cycle distortion, and other impairments.

Figure 6:
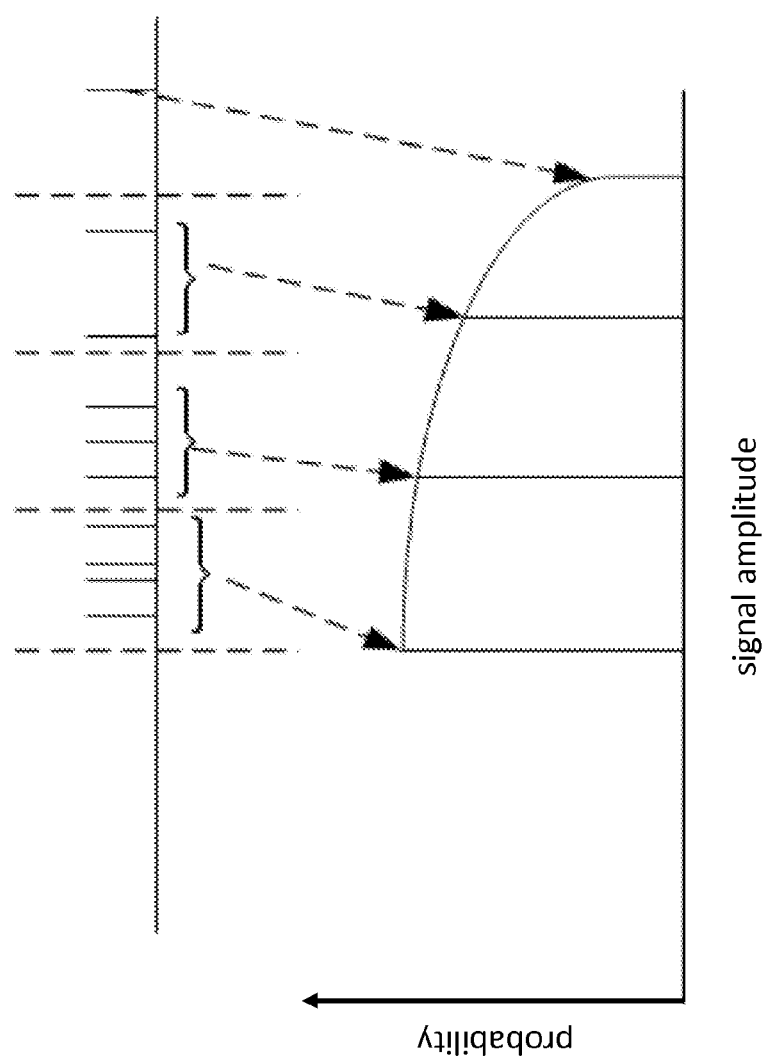
FIG. 6 illustrates an example in which ISI PDF values in uniform intervals may be combined to form a continuous ISI PDF.

FIG. 6 illustrates an example in which the ISI PDF values in uniform intervals may be combined to form a continuous ISI PDF. When the channel is "long," e.g., has lots of taps, a continuous ISI PDF may be generated by dividing the horizontal axis (e.g., signal amplitude) into uniform intervals and adding the probability values in the same interval into one representative number for the interval. The ISI PDF that is ultimately selected, which is often the ISI PDF that leads to the lowest BER value, is generally the one having the smallest width. The "width," as used herein, refers to the spread of a distribution function and may be measured, for example, by the standard deviation of the distribution function.

Figure 7:
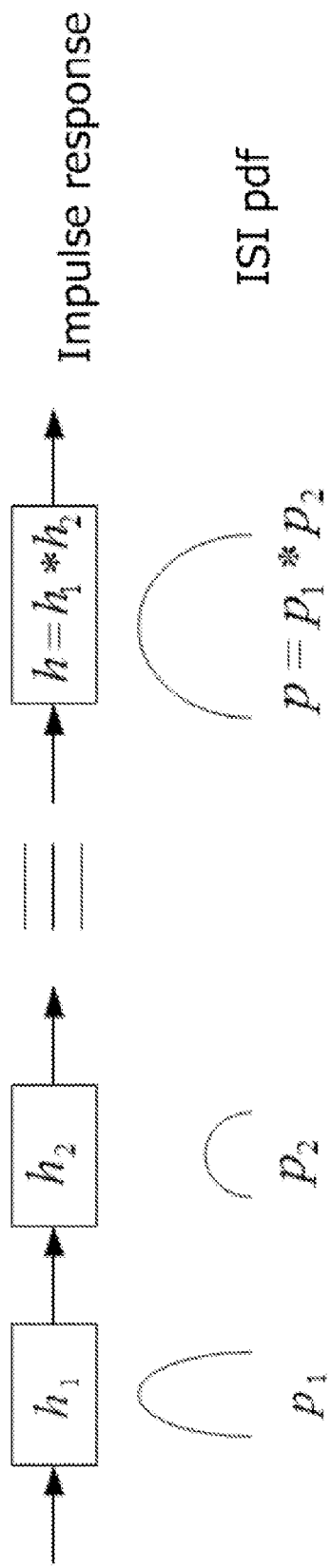
FIG. 7 illustrates an example in which the overall ISI PDF of two systems connected in series is well approximated by the convolution of the ISI PDF of each system.

FIG. 7 illustrates an example of how the overall ISI PDFs of systems in series may be convoluted. After obtaining the overall ISI PDF by solving Equation 1 for the $p_i$ values using the BER values received from the eye monitor 106, the link optimization unit 101 may extract the channel ISI PDF from the overall ISI PDF by deconvoluting (also known as de-embedding) the overall ISI PDF with an impulse PDF corresponding to the current setting of the Tx FIR filter 103 and with an impulse PDF corresponding to the current setting of the CTLE 104. As indicated earlier, these impulse PDFs may be stored in and retrieved from the storage unit 111. Extracting the channel ISI PDF in this manner is possible because, generally, if two systems are connected in series, and both have a large number of taps, the ISI PDF of the overall system is well approximated by the convolution (denoted by *) of the two ISI PDFs. Thus, by performing deconvolution on the overall ISI PDF, the channel ISI PDF may be estimated.

In some embodiments, instead of performing deconvolution to extract the channel ISI PDF, the link optimization unit 101 may find the Fourier transform of the overall ISI PDF and divide it by the Fourier transform of the impulse PDFs corresponding to the current settings of the Tx FIR filter 103 and the CTLE 104, and then find the inverse-Fourier transform of the quotient to arrive at the channel ISI PDF. Extracting the channel ISI PDF in this manner is possible because convolution becomes multiplication in the frequency domain and deconvolution becomes division (where the divisor≠0). For example, if
1. P(jw) is the Fourier transform of the overall ISI PDF,
2. $P_1$(jw) is the Fourier transform of the channel ISI PDF,
3. $P_2$(jw) is the Fourier transform of the impulse PDF of the Tx FIR filter 103,
4. $P_3$(jw) is the Fourier transform of the impulse PDF of the CTLE 104,
5. "IFT" is the inverse transform operator, and
6. $p_1$ is the channel ISI PDF
then $$p_1 = IFT\{P_1(jw)\} = IFT\left\{\frac{P(jw)}{P_2(jw)P_3(jw)}\right\}$$

After extracting the channel ISI PDF from the overall ISI PDF, the link optimization unit 101 may use the channel ISI PDF to estimate the overall ISI PDF of the link for all other settings of the Tx FIR filter 103 and the CTLE 104 (excluding the current settings). For ease of description, the overall ISI PDFs corresponding to all other settings excluding the current settings are herein referred to as the "comparative overall ISI PDFs."

For example, the link optimization unit 101 may combine the channel ISI PDF with the impulse PDFs corresponding to the rest of the settings of the Tx FIR filter 103 and CTLE 104 by convoluting them to arrive at the comparative overall ISI PDFs. In some embodiments, instead of using convolutions, the link optimization unit 106 may combine the channel ISI PDF and the impulse PDFs in the frequency domain through Fourier transforms and inverse-Fourier transforms to estimate the comparative overall ISI PDFs.

The link optimization unit 101 may calculate a BER value using Equation 1 for each of the comparative overall ISI PDFs. For ease of description, the BER values corresponding to the comparative overall ISI PDFs are herein referred to as the "comparative BER values." As an example, Table 1 below shows BER values corresponding to possible settings of the Tx FIR filter 103, which has 3 different settings, and the CTLE 104, which has 4 different settings.

TABLE 1

| Tx FIR filter settings | CTLE settings | BER value |
|---|---|---|
| 1 | 1 | 1.2e-6 |
| 1 | 2 | 2.1e-3 |
| 1 | 3 | 3.7e-5 |
| 1 | 4 | 6.6e-4 |
| 2 | 1 | 2.6e-7 |
| 2 | 2 | 7.2e-2 |
| 2 | 3 | 3.8e-5 |
| 2 | 4 | 4.7e-2 |
| 3 | 1 | 1.3e-10 |
| 3 | 2 | 7.1e-3 |
| 3 | 3 | 4.9e-6 |
| 3 | 4 | 2.1e-7 |

The highlighted row shows the current settings and the current BER value (2, 1→2.6e-7). That is, setting "2" is the current setting according to which the data signal was pre-emphasized by the Tx FIR filter 103, setting "1" is the current setting according to which the data signal was equalized by the CTLE 104, and the current BER value "2.6e-7" is the BER value calculated by the eye monitor 106 on the basis of the equalized signal. The non-highlighted rows show the comparative BER values calculated for the comparative overall ISI PDFs corresponding to the rest of the settings.

After calculating the comparative BER values, the link optimization unit may determine that the settings associated with the lowest BER value among the current BER value and the comparative BER values are the optimal settings. For example, in the case of Table 1 above, the settings (3, 1) are the optimal settings because they correspond to the lowest BER value of 1.3e-10. In some embodiments, instead of calculating the comparative BER values, the link optimization unit 101 may determine the settings associated with an overall ISI PDF having the shortest width as the optimal settings. In other embodiments, the link optimization unit 101 may determine the settings associated with the maximum timing margin as the optimal settings.

After determining the optimal settings, the link optimization unit 101 may provide these settings to the respective link components. For example, in the case of Table 1 above, the link optimization unit 101 may indicate to the CTLE 104 that setting "1" is the optimal setting and indicate to the Tx FIR filter 103 that setting "3" is the optimal setting. Since the Tx FIR filter 103 resides on the transmitting end of the channel 105 and the link optimization unit 101 resides on the receiving end of the channel 105, the link optimization unit 101 may communicate the optimal setting via a back channel between the transmitter and the receiver (see FIG. 1).

Although the embodiment shown in FIG. 1 includes two link components, the Tx FIR filter 103 and the CTLE 104, the present system and method may be used to optimize any number and type of link components. Furthermore, in addition to determining the optimal settings of the link components, the present system and method may be used to determine whether the phase recovered by the CDR is the optimal phase, such as by comparing the BER values provided by the eye monitor for a range of phases, and to verify the optimality of DFE tap coefficients (i.e., did the DFE taps converge to the optimal settings).

Figure 8:
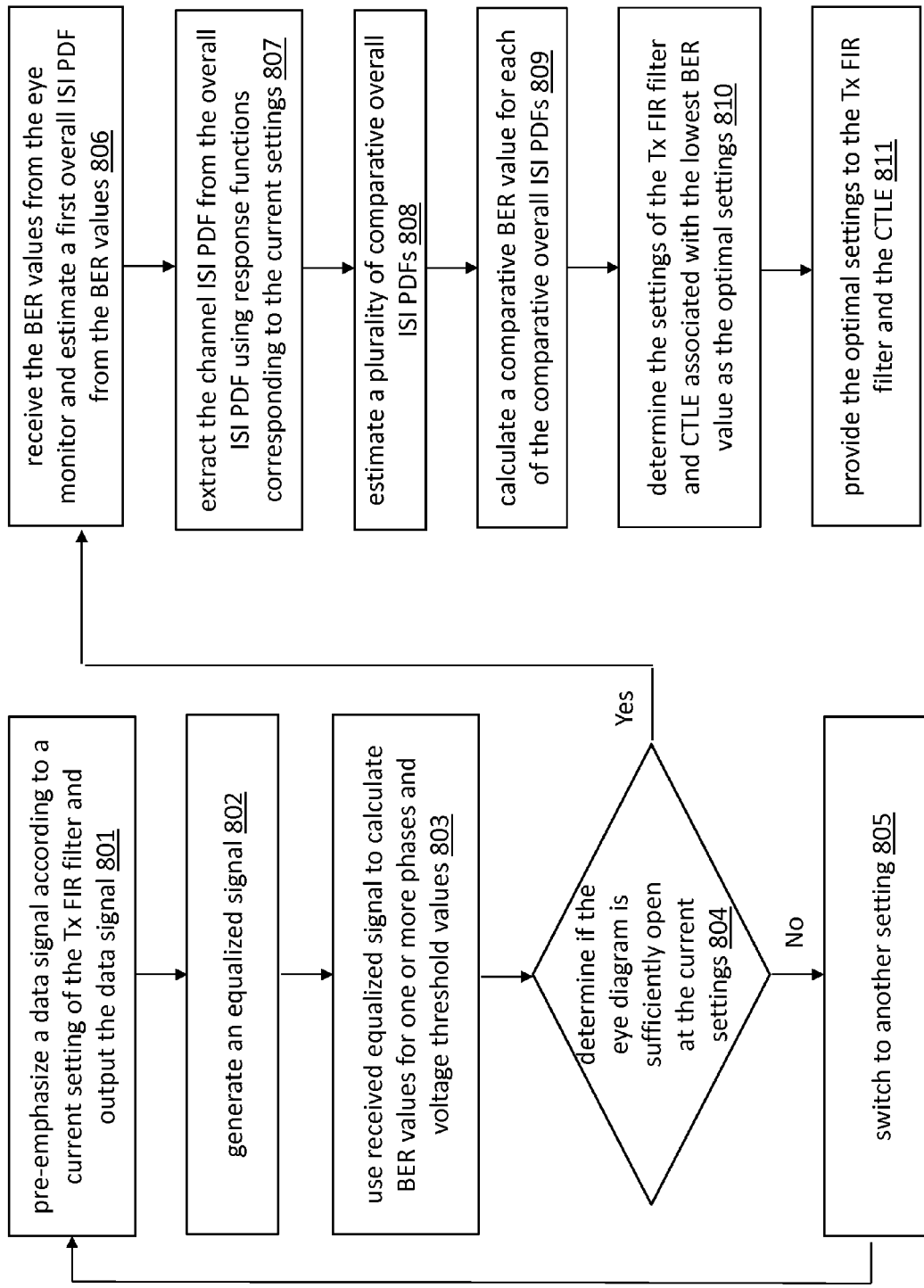
FIG. 8 is a flowchart summarizing a training process for finding the optimal settings of the Tx FIR filter and CTLE, according to an exemplary embodiment of the present system and method.

FIG. 8 is a flowchart summarizing a training process for finding the optimal settings of the Tx FIR filter and CTLE, according to an exemplary embodiment of the present system and method. The Tx FIR filter pre-emphasizes a data signal according to a current setting of the Tx FIR filter and outputs the data signal over a channel to the receiver (801). The CTLE in the receiver equalizes the received data signal to generate an equalized signal (802).

The eye monitor receives the equalized signal and uses the equalized signal to calculate BER values for one or more phases and voltage threshold values (803). On the basis of the BER values, the eye monitor determines if the eye diagram is sufficiently open at the current settings of the Tx FIR filter and CTLE (804). If the eye diagram is not sufficiently open, the process changes the setting (805) and proceeds back to step 801 to transmit and/or equalize another data signal using different settings. If the eye diagram is sufficiently open, the process proceeds to step 806.

The link optimization unit receives the BER values from the eye monitor and estimates an overall ISI PDF from the BER values (806). The link optimization unit extracts the channel ISI PDF from the overall ISI PDF using response functions corresponding to the current settings of the Tx FIR filter and CTLE (807). Using the channel ISI PDF, the link optimization unit estimates a plurality of comparative overall ISI PDFs (808). The link optimization unit calculates a comparative BER value for each of the comparative overall ISI PDFs (809). The link optimization unit determines the settings of the Tx FIR filter and CTLE associated with the lowest BER value as the optimal settings (810). The link optimization unit provides the optimal settings to the Tx FIR filter and the CTLE (811).

Figure 9:
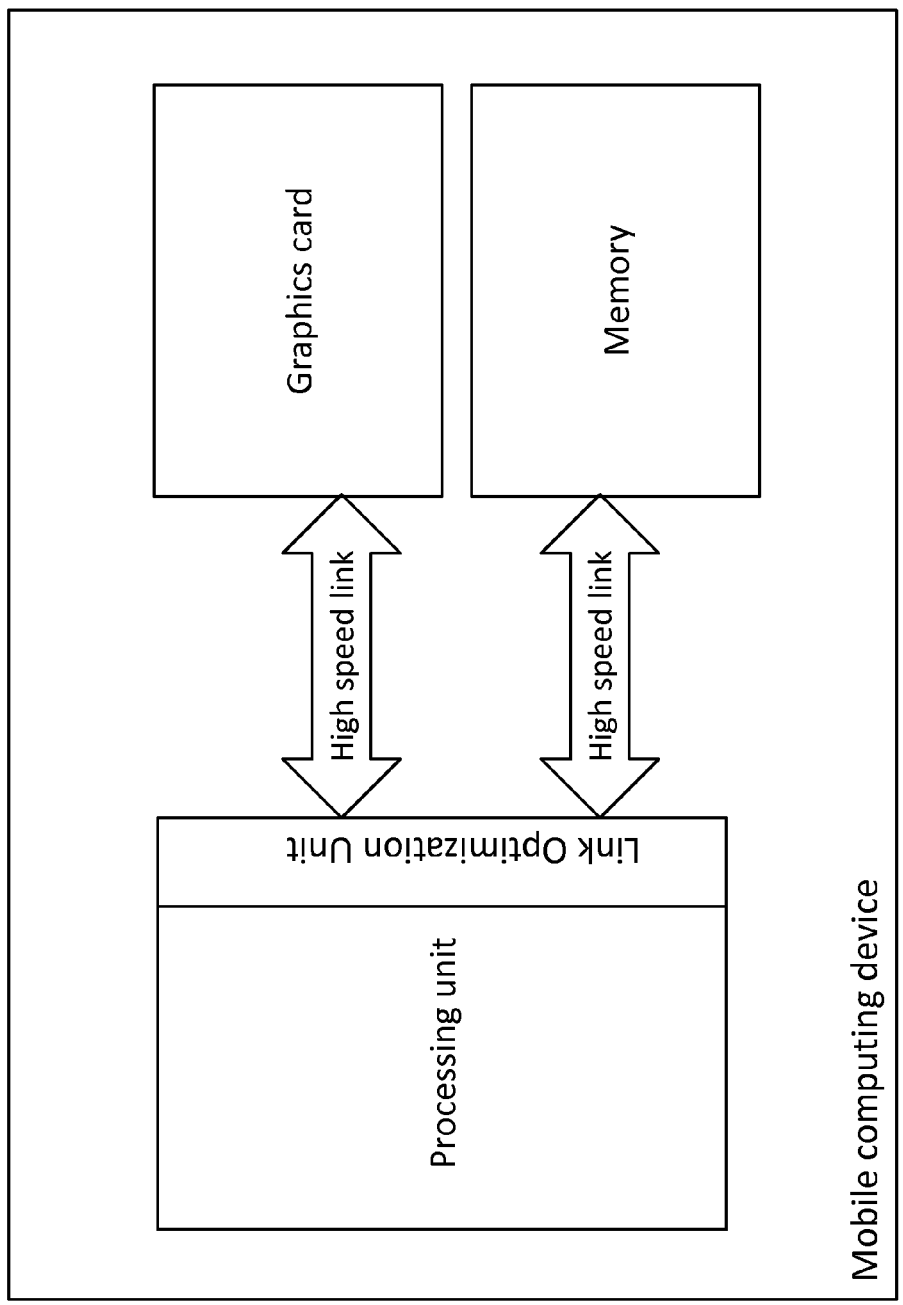
FIGS. 9, 10, and 11 illustrate exemplary systems in which embodiments of the present system and method disclosed herein may be implemented.
Figure 10:
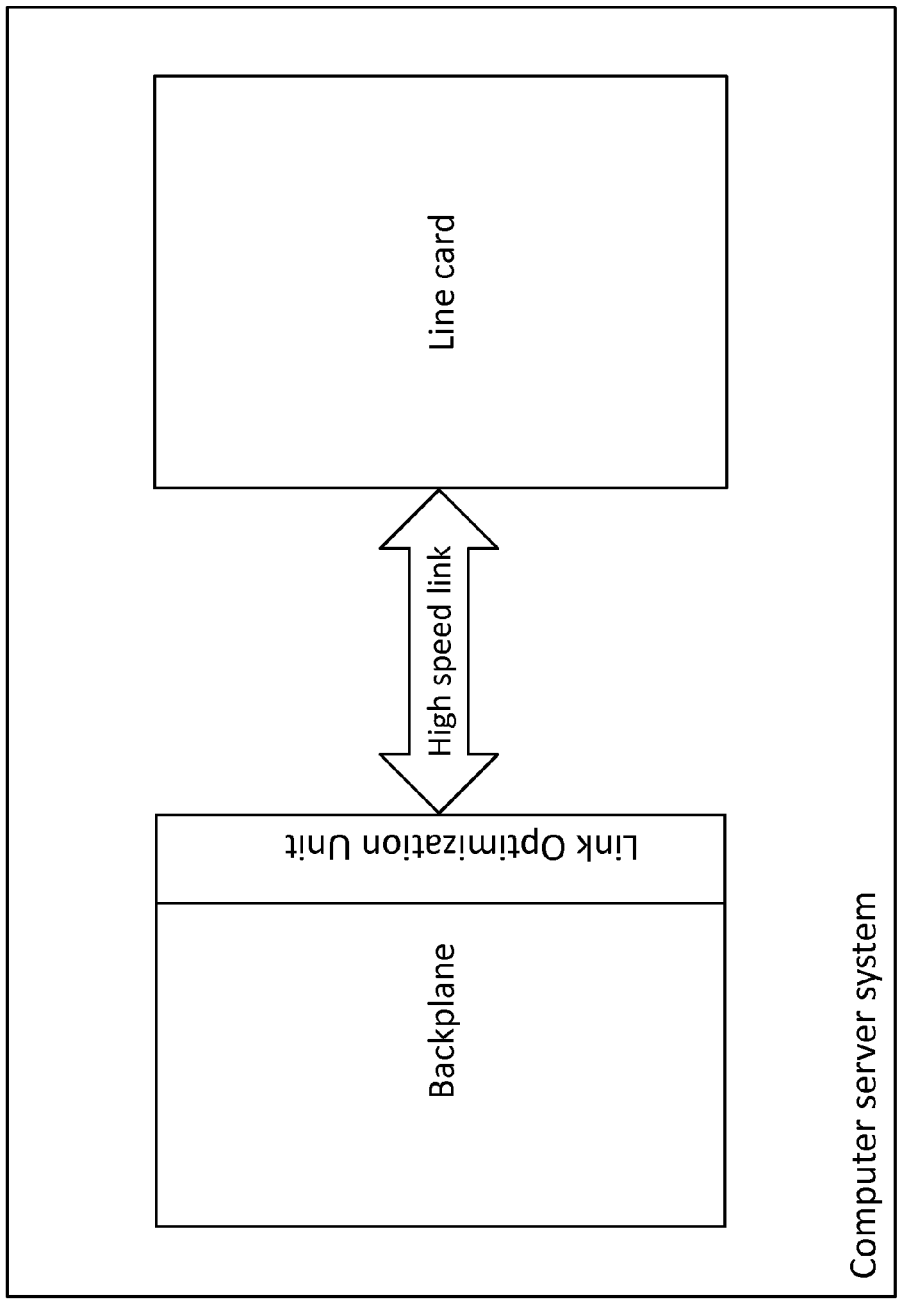
Figure 11:
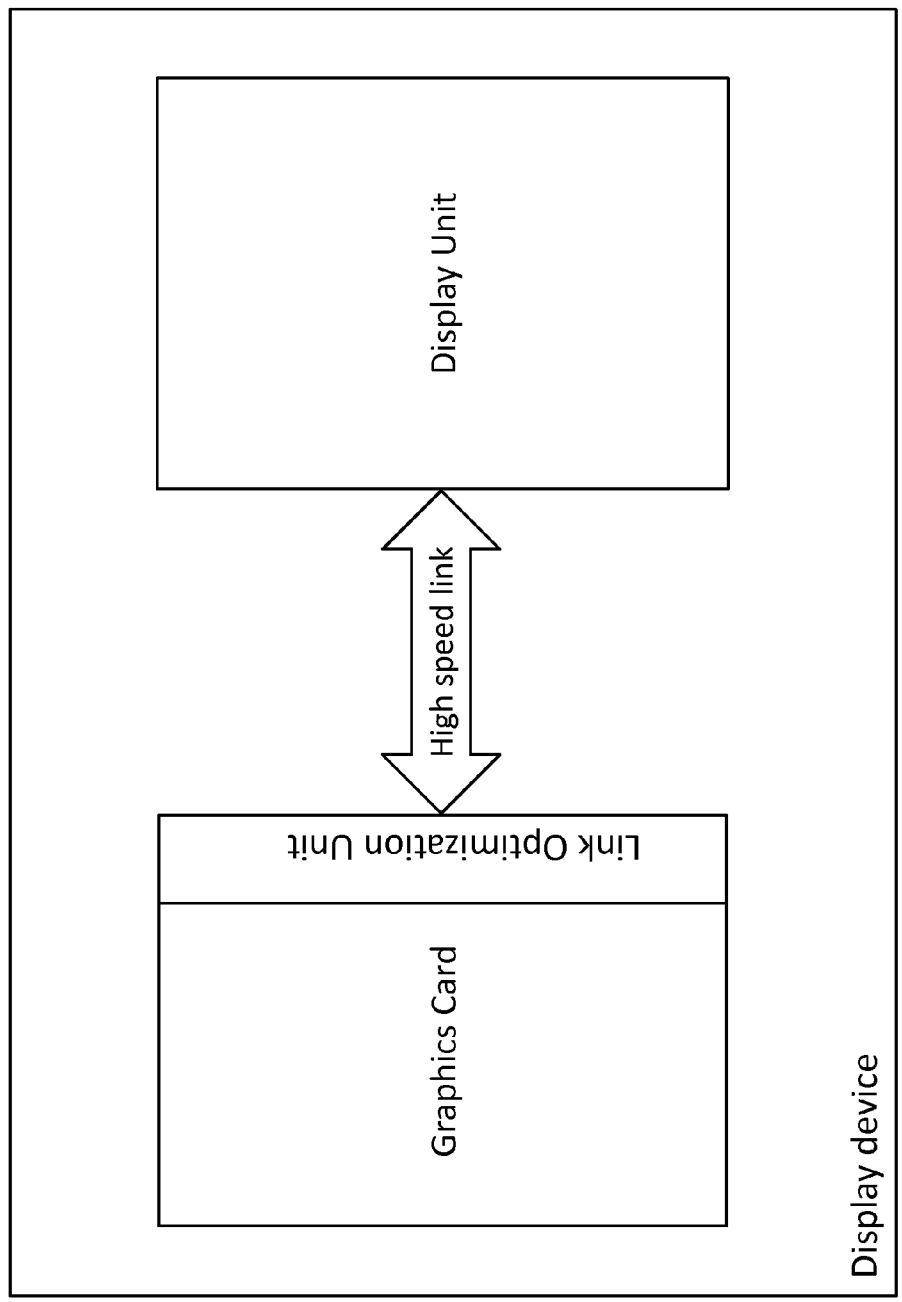

The present system and method of link optimization may be applied to any type of high speed link. For example, the present system and method may be applied to high speed links in a mobile computing device (FIG. 9). The mobile computing device of FIG. 9 may include laptops, tablets, phones, or any other computing device that is portable. As shown, a high-speed link may be used for communication between the processing unit and memory and/or graphics card. The system and method disclosed above may be adapted to high speed links in a server system, such as what is shown in FIG. 10. In this example, the high speed link is used for communication between the server backplane and a line card. In another embodiment, high speed links such as the one disclosed above may be incorporated into a display device. For example, FIG. 11 shows a high speed link configured to be used for communication between a display unit and a graphics card. Furthermore, the present system and method of link optimization may be implemented using hardware elements, software elements, or a combination of hardware and software elements.

The embodiments of the present system and method disclosed herein may be implemented in various computing systems. The computer may be implemented as a combination of computer hardware including a processor and a memory with one or more computer program products, i.e., one or more "modules" of computer program instructions encoded on a computer-readable medium for execution by, or to control the operation of, data processing apparatus. The memory may include a computer-readable storage medium.

Common forms of computer-readable storage media include, for example, a floppy disk, a flexible disk, a hard disk, magnetic tape, any other magnetic medium, a random access memory (RAM), a CD-ROM disk, digital video disc (DVD), and various forms of volatile memory, non-volatile memory that can be electrically erased and rewritten. Examples of such non-volatile memory include NAND flash and NOR flash and any other optical or magnetic medium. The memory can also comprise various other memory technologies as they become available in the future.

The system further may include a mass storage device, portable storage medium drive(s), output devices, user input devices, a graphics display, and peripheral devices. The components may be connected via a single bus. Alternatively, the components may be connected via multiple buses. The components may be connected through one or more data transport means. Processor unit and main memory may be connected via a local microprocessor bus, and the mass storage device, peripheral device(s), portable storage device, and display system may be connected via one or more input/output (I/O) buses. Mass storage device, which may be implemented with a magnetic disk drive or an optical disk drive, may be a non-volatile storage device for storing data and instructions for use by the processor unit. Mass storage device may store the system software for implementing various embodiments of the disclosed systems and methods for purposes of loading that software into the main memory. Portable storage devices may operate in conjunction with a portable non-volatile storage medium, such as a floppy disk, compact disk or Digital video disc, to input and output data and code to and from the computing system. The system software for implementing various embodiments of the systems and methods disclosed herein may be stored on such a portable medium and input to the computing system via the portable storage device.

Peripherals may include any type of computer support device to add additional functionality to the computing system. Peripheral device(s) may include a modem or a router or other type of component to provide an interface to a communication network. The communication network may comprise many interconnected computing systems and communication links. The communication links may be wireline links, optical links, wireless links, or any other mechanisms for communication of information. The components contained in the computing system may be those typically found in computing systems that may be suitable for use with embodiments of the systems and methods disclosed herein and are intended to represent a broad category of such computing components that are well known in the art. Thus, the computing system may be a personal computer, hand held computing device, tablets, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, and other suitable operating systems. Due to the ever changing nature of computers and networks, the description of the computing system is intended only as a specific example for purposes of describing embodiments. Many other configurations of the computing system are possible having more or less components.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, message servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

The present system and method may be carried out in other specific ways than those herein set forth without departing from the scope and essential characteristics of the invention. The various features of the representative examples and the dependent claims may be combined in ways that are not specifically and explicitly enumerated in order to provide additional embodiments of the present teachings. The present embodiments are, therefore, to be considered in all respects as illustrative and not restrictive, and all changes coming within the meaning and equivalency range of the appended claims and above disclosure are intended to be embraced therein.

What is claimed is:

1. A method of characterizing a channel between a transmitter and a receiver including an equalizer, comprising:
   determining an overall intersymbol interference (ISI) probability density function (PDF) from eye monitor data obtained for a current equalizer setting;
   extracting a channel ISI PDF from the overall ISI PDF by using the current equalizer setting;
   generating an overall ISI PDF for a different equalizer setting by using the channel ISI PDF and an impulse response at the different equalizer setting;
   determining an optimal equalizer setting on the basis of at least the overall ISI PDF generated for the different equalizer setting; and
   providing the optimal equalizer setting to the equalizer to update the current equalizer setting.

2. The method of claim 1, wherein the extracting of the channel ISI PDF comprises using an equalizer response function corresponding to the current equalizer setting.

3. The method of claim 1, wherein the extracting of the channel ISI PDF comprises deconvoluting the overall ISI PDF with at least one of an impulse PDF corresponding to the transmitter and an impulse PDF corresponding to the equalizer in the current equalizer setting.

4. The method of claim 1, wherein the extracting of channel ISI PDF for the current equalizer setting comprises:
   applying Fourier transformation to the overall ISI PDF to generate transformed overall ISI PDF;
   dividing the transformed overall ISI PDF by Fourier transform of impulse PDFs corresponding to the current equalizer setting to generate a quotient; and
   inverse-Fourier transforming the quotient.

5. The method of claim 1, wherein the determining of the overall ISI PDF from eye monitor data comprises using the following equation:

$$BER = \sum_i BER_i p_i = \sum_i P[n > d_i] p_i = \sum_i p_i Q\left(\frac{d_i}{\sigma_n}\right)$$

Wherein $BER_i = P[n > d_i] = Q(d_i/\sigma_n)$ represents the probability of error due to noise, Q being a Q-function, $\sigma_n$ represents the noise rms power, $n \geq d_i$ represents a signal amplitude level n greater than a signal amplitude level $d_i$, i represents a data point of the eye monitor data, and $p_i$ represents the ISI PDF.

6. A method of optimizing a high-speed link including an equalizer, the method comprising:
   determining a first overall ISI PDF from eye monitor data obtained for a current equalizer setting;
   extracting a channel ISI PDF from the first overall ISI PDF by using the current equalizer setting;
   generating a second overall ISI PDF for a different equalizer setting by using the channel ISI PDF;
   determining an optimal equalizer setting based on a comparison of the first overall ISI PDF and the second overall ISI PDF; and
   providing the optimal equalizer setting to the equalizer to update the current equalizer setting.

7. The method of claim 6 further comprising:
   obtaining an impulse response function for the different equalizer setting; and
   using the impulse response function with the channel ISI PDF for the generating of the second overall ISI PDF.

8. The method of claim 6, wherein determining the optimal equalizer setting comprises:
   calculating Bit Error Rate (BER) values for the current equalizer setting and the different equalizer setting; and
   selecting the setting that results in lowest BER value.

9. The method of claim 6, wherein determining the optimal equalizer setting includes:
   estimating the second overall ISI PDFs for the different equalizer setting by combining the channel ISI PDF with a corresponding equalizer response function for the different equalizer setting; and selecting the setting associated with either the first overall ISI PDF or the second overall ISI PDFs as the optimal equalizer setting based on which of the two equalizer settings results in a smaller spread of distribution function.

10. The method of claim 6, wherein the impulse response function is a Fourier transform function of a PDF that corresponds to the impulse response of the equalizer for the different equalizer setting.

11. The method of claim 6, further comprising receiving the first BER values for a plurality of phases, and the optimal equalizer setting is determined for the plurality of phases.

12. The method of claim 6, wherein the high-speed link includes a filter at the transmitter, further comprising:
  obtaining a plurality of filter response functions corresponding to a plurality of filter settings for the filter at a transmitter;
  determining an optimal filter setting among the plurality of filter settings on the basis of the channel ISI PDF and the plurality of filter response functions; and
  providing the optimal filter setting to the filter configured to pre-emphasize a signal before transmitting the signal over a channel.

13. The method of claim 6, wherein the equalizer is a Continuous Time Linear Equalizer (CTLE) in the receiver.

14. The method of claim 13, wherein the eye monitor data is obtained using a recovered clock signal from a clock data recovery (CDR) unit and an equalized signal from the CTLE.

15. A system of optimizing a high-speed link including a channel carrying a data signal between a transmitter and a receiver, the system comprising:
  an equalizer having a plurality of equalizer settings and configured to equalize a signal received from a channel according to a current equalizer setting to generate an equalized signal;
  an eye monitor configured to output first bit error rate (BER) values on the basis of the equalized signal; and
  a link optimization unit including:
    a module configured to determine a first overall intersymbol interference (ISI) probability density function (PDF) from the BER values obtained for the current equalizer setting;
    a module configured to extract a channel ISI PDF for the current equalizer setting from the first overall ISI PDF;
    a module configured to generate a second overall ISI PDF for a different equalizer setting by using the channel ISI PDF for the current equalizer setting; and
    a module configured to determine an optimal equalizer setting on the basis of at least the overall ISI PDF generated for the different equalizer setting and provide the optimal equalizer setting to the equalizer to update the current equalizer setting.

16. The system of claim 15, wherein the link optimization unit further comprises:
  a module configured to calculate the Bit Error Rate (BER) values for the current equalizer setting and the different equalizer setting; and
  a module configured to select the setting that results in lowest BER value.

17. The system of claim 15, wherein the link optimization unit further comprises:
  a module configured to obtain an impulse response function for the different equalizer setting; and
  a module configured to use the impulse response function for the different equalizer setting with the channel ISI PDF to generate the second overall ISI PDF.

18. The system of claim 17, wherein the impulse response function is a Fourier transform function of a PDF that corresponds to the impulse response of the equalizer for the different equalizer setting.

19. The system of claim 15, wherein the link optimization unit further comprises a module configured to determine as the optimal equalizer setting an equalizer setting associated with the smallest spread of distribution function.

20. The system of claim 15, wherein the eye monitor is configured to output the first BER values for a plurality of phases, and the link optimization unit is configured to determine the optimal equalizer setting for the plurality of phases.

* * * * *